United States Patent [19]

French et al.

[11] 4,260,091
[45] Apr. 7, 1981

[54] FLEXIBLE TRUCK STORAGE ACCESSORY AND GUN CARRIER

[75] Inventors: Harry C. French; John R. Lapinski; John J. MacCready, all of Jackson, Mich.

[73] Assignee: J. H. J. Company, Ltd., Jackson, Mich.

[21] Appl. No.: 133,519

[22] Filed: Mar. 24, 1980

[51] Int. Cl.³ .............................................. B65D 33/14
[52] U.S. Cl. ............................. 224/311; 224/42.46 R; 224/913; 150/1; 150/52 R
[58] Field of Search ........ 224/311, 223, 913, 42.46 R; 150/1 R, 52 R

[56] References Cited

U.S. PATENT DOCUMENTS

| D. 197,146 | 12/1963 | Fisher | 150/1 X |
|---|---|---|---|
| 2,576,327 | 11/1951 | Wright | 224/42.46 R |
| 2,671,671 | 3/1954 | Kupfer | 224/42.46 R |
| 2,710,638 | 6/1955 | Ford | 150/1 |
| 3,124,287 | 3/1964 | Belzer | 224/311 |
| 3,967,666 | 7/1976 | Farrar | 150/1 |

*Primary Examiner*—Steven M. Pollard
*Attorney, Agent, or Firm*—Beaman & Beaman

[57] ABSTRACT

An accessory for trucks, such as pickup trucks, for the storage of miscellaneous items, rifles or shotguns comprising a flexible panel supported upon the vehicle only at its upper edge including a plurality of upper vertically oriented pockets and a horizontally disposed elongated long gun receiving pocket adjacent the panel lower edge. The mounting of the panel at only the upper edge permits the lower portion to be flexed and positioned as desired to provide access to the gun storage pocket, and a closure within the firearm storage pocket access opening seals the opening to comply with the firearm transport regulations.

5 Claims, 5 Drawing Figures

FLEXIBLE TRUCK STORAGE ACCESSORY AND GUN CARRIER

BACKGROUND OF THE INVENTION

While pickup truck vehicles enjoy wide popularity for both personal transportation and load carrying capabilities the design of a pickup truck cab limits storage area therein. Due to the utilitarian nature of such vehicles the owners often desire to carry or store a wide variety of equipment within the truck cab, and as the only available storage space within the cab is the limited space behind the seat, this rear cab area usually becomes littered and disarrayed due to the many articles stored on the cab floor behind the seat.

Also, pickup trucks are widely used during hunting trips, and the owners thereof often desire to transport shotguns or rifles. To store a long gun behind the cab seat is undesirable due to possible damage thereto, and even when the firearm is cased the owner usually desires not to lay the firearm on the cab floor behind the seat because of the disarray and possible damage that may result therefrom. Also, most states require that firearms be encased during transport, and owners prefer that the presence of the firearm be not readily discernible to the casual observer in view of the possibility of theft.

It is an object of the invention to provide a truck storage accessory which is readily mounted within the cab of a truck behind the seat utilizing heretofore unused space wherein the accessory includes storage pockets readily accessible to a seated operator or passenger.

An additional object of the invention is to provide a truck storage accessory which is of economical manufacture, easy to install, and utilizes a long gun firearm storage pocket wherein the firearm may be safely encased for transport, its presence is not readily discerned by looking into the vehicle cab, and access to the firearm is readily achieved because of the flexible nature of the accessory.

The truck storage accessory in accord with the invention comprises a flexible panel of rectangular configuration having upper, lower and end edges. The panel is formed of outer and inner layers of flexible material, preferably vinyl having a reinforced backing, and the layers are sewn together, and bound, at preselected locations to define a plurality of vertically extending pockets having access openings adjacent the panel upper edge.

The location and configuration of the vertical pockets is such that a horizontally disposed elongated firearm carrying pocket is defined in the panel adjacent the lower edge, and an access opening for the firearm receiving pocket is located within an end edge of the panel adjacent the lower edge. Closure means are associated with this access opening whereby a firearm received within the pocket may be sealed therein.

The panel is mounted to the vehicle at its upper edge by fasteners attached to the vehicle cab rear wall structure. By attaching the panel solely at its upper edge it is suspended from this edge and the lower region of the panel may be flexed permitting the gun pocket access opening to easily be positioned for receiving a firearm even though the access opening between the truck cab door and seat is limited.

The panel layer's material includes an attractive surface, and as the firearm receiving pocket is located well below the upper region of the vehicle seat the lower region of the panel is not readily visible, and the presence of a firearm within the lower panel pocket is not easily discerned.

BRIEF DESCRIPTION OF THE DRAWING

The aforementioned objects and advantages of the invention will be appreciated from the following description and accompanying drawing wherein.

DESCRIPTION OF THE PREFERRED EMBODIMENT

Figure 1:
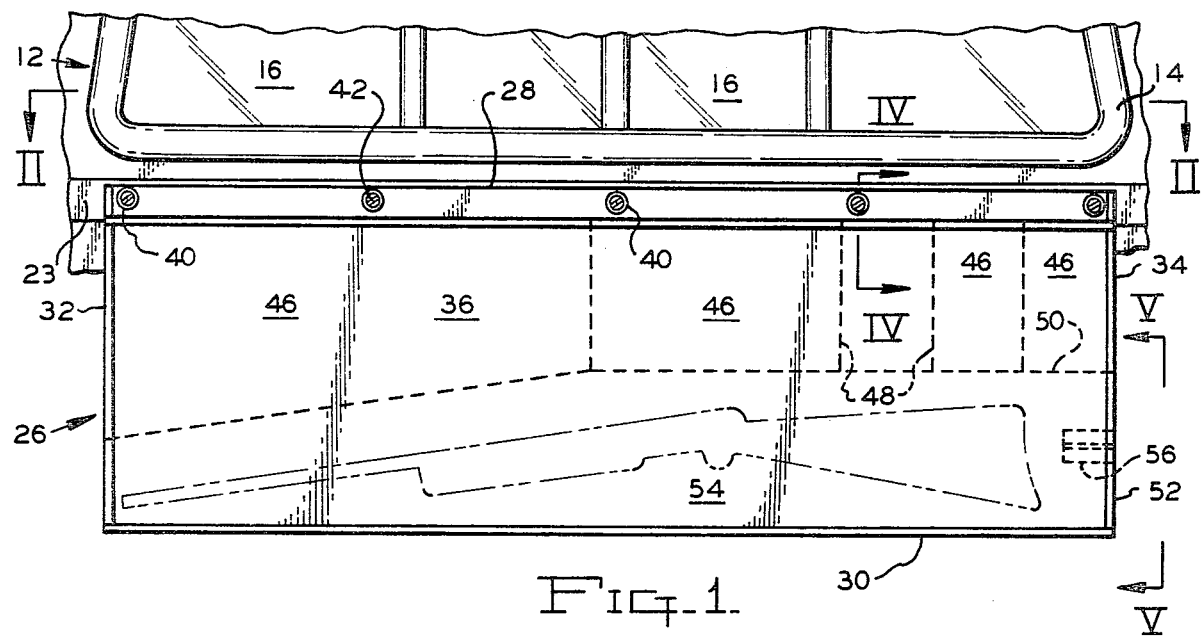
FIG. 1 is an elevational view of a truck accessory in accord with the invention as mounted within the vehicle cab, a firearm being located within its pocket indicated in dotted lines.

The accessory of the invention is of particular advantage when used with trucks, especially pickup trucks, wherein the space behind the seat and the cab rear wall is limited and ineffectively utilized. In a typical truck cab arrangement the cab includes a rear wall 10, FIG. 2, having a rear window 12 mounted thereon. The rear window is mounted within the cab wall by a rubber window molding 14 having grooves defined therein for receiving the cab wall and the rear window glass panels 16. The cab structure also includes sidewalls 18 which extend forwardly of the rear wall defining the door opening edge 20 which cooperates with the vehicle doors 22. The cab rear wall also includes a double walled reinforcing rib 23. As apparent in FIG. 2, the vehicle seat back is represented at 24, and access clearance between the edge 20 and the rear seat 24 is represented at A. The clearance A, of course, will vary between truck manufacturer and models, and in accordance with the horizontal adjustment of the seat, but in most instances this clearance will only be a matter of inches.

Figure 4:
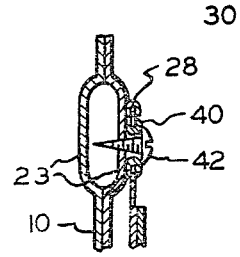
FIG. 4 is an enlarged, detailed, sectional view taken through a mounting grommet along Section IV—IV of FIG. 1.
Figure 5:
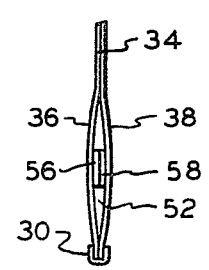
FIG. 5 is a detail, elevational view of the firearm receiving pocket access opening as taken along Section V—V of FIG. 1.

The storage accessory comprises a panel 26 of a rectangular configuration consisting of a pair of layers sewn together at selected locations. The accessory includes horizontally disposed upper edge 28, and a lower edge 30, and vertically disposed end edges 32 and 34. The panel 26 is formed of an outer layer 36 disposed toward the cab seat 24, and an inner layer 38 normally located adjacent the vehicle rear wall 10. The outer layer 36 is of a vertical dimension slightly less than the inner layer 38, and a plurality of grommets 40, FIG. 4, are formed in the inner layer adjacent the upper edge 28, defined by the inner layer, for receiving mounting screws 42 which may be threaded into the reinforcing rib 23. Thus, the storage accessory may be easily mounted within the truck cab merely by the use of a drill and screwdriver, requiring no extraordinary skill. The mounting of the storage accessory panel is solely adjacent the upper edge 28 by the mounting screws wherein the lower region of the panel is suspended.

The layers 36 and 38 are preferably formed of a flexible material such as vinyl having a fabric reinforcing backing. Such material is attractive, of relatively high strength and durability, and may be readily sewn. The upper edges of the layers are finished by sewing a binding thereto, a reinforcing fabric strip 44 is sewn to the back of layer 38 at edge 28 and the panel edges 30 and 32 are sewn together and bound. The vertically extending pockets 46 are defined by sewing the layers together as at 48, and the bound edges of the layers are also sewn together between the upper edge of outer layer 36 and edge 30. However, between seam 50 and lower edge 30 and layer edges 34 are not sewn together, but are bound, wherein an opening 52 is defined for providing access to the horizontally disposed firearm receiving pocket 54 defined in the lower region of the accessory.

The firearm receiving pocket 54 is defined by the seam 50 at its upper region, and it will be appreciated that the oblique configuration of seam 50 reduces the vertical dimension of the pocket 54 adjacent edge 32 and providing a maximum dimension adjacent the access opening 52. This variable dimension of the firearm receiving pocket permits the vertical pocket 46 adjacent the edge 32 to be of greater vertical dimension than the vertical pockets adjacent edge 34, and the vertical dimension of the firearm pocket adjacent the edge 34 is sufficient to receive a firearm having telescopic sights mounted thereon.

The access opening 52 is provided with fastening means, which could be in the form of a zipper, snaps, or the like. In the preferred embodiment the fastening means takes the form of a Velcro fastener including a hooked portion 56 sewn to layer 36, and a closed looped portion 58 sewn to inner layer 36 whereby upon pressing the portions together the hooks interact with the closed loops in the known manner. Such sealing of the access opening will assure the confinement of the firearm, and comply with firearm transport regulations which require that firearms be encased when transported by the vehicle.

The vertically oriented pockets 46 each form an access opening disposed adjacent the upper edge 28, and items may be readily stored in these pockets by persons sitting upon the vehicle seat merely by reaching over the seat and placing the item thereon. The various horizontal and vertical dimensions of the pockets permit the items to be stored in an upright manner, if desired, and as the horizontal length of the accessory panel 26 is in excess of 50 inches in the commercial embodiment the pockets 46 provide extensive storage.

Figure 2:
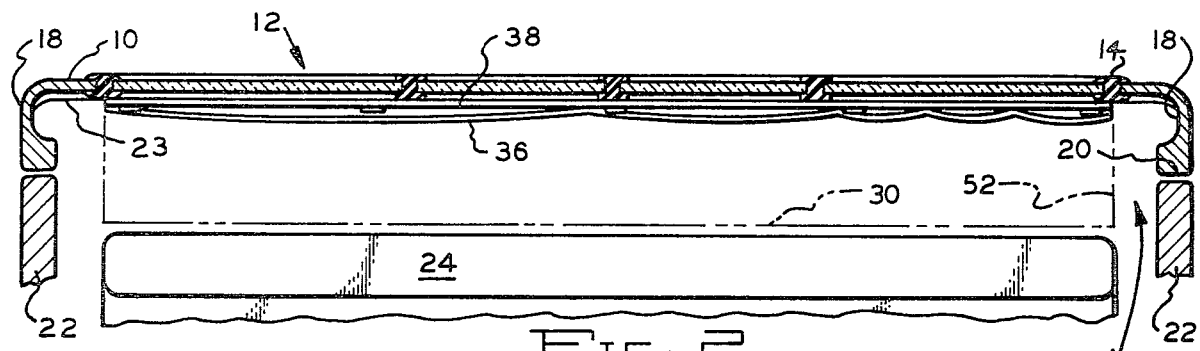
FIG. 2 is a plan sectional view as taken along Section II—II of FIG. 1.
Figure 3:
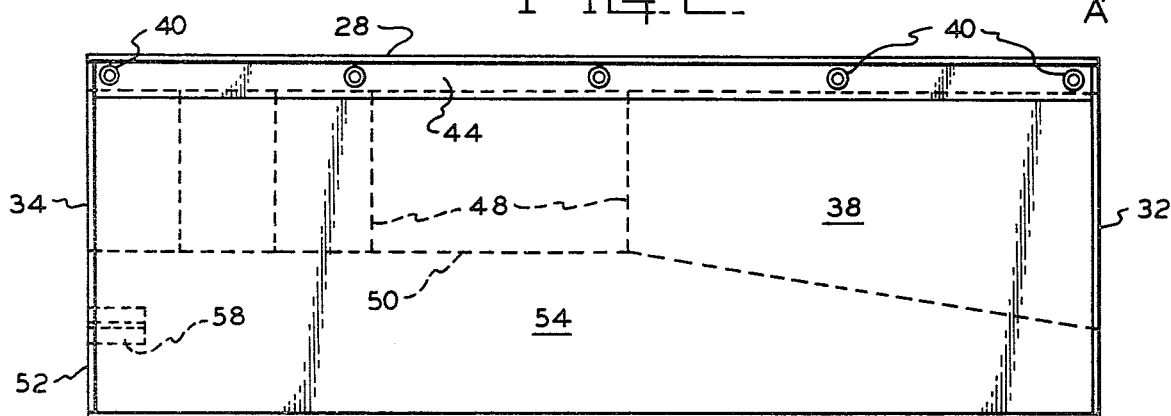
FIG. 3 is a rear elevational view of the accessory.

In that the accessory is mounted only adjacent the upper edge 28 the lower region thereof is suspended and may be easily deflected toward the seat 24 as shown in dotted lines in FIG. 2. Such deflection will locate the gun pocket opening 52 forward of the door edge 20 permitting ready access to the firearm opening permitting the firearm to be readily inserted into its pocket through clearance A. However, during normal use, the weight of the firearm will cause the inner layer 38 to be disposed adjacent the rear truck wall 10, and the lower region of the storage accessory will not be visible to the casual observer looking into the truck cab. Accordingly, the presence of a firearm within pocket 54 cannot be easily determined and the likelihood of theft reduced.

It is appreciated that various modifications to the inventive concept may be apparent to those skilled in the art without departing from the spirit of the invention.

We claim:

1. A vehicle storage and gun carrier comprising, in combination, a flexible panel having an upper edge, a lower edge, and first and second ends, a plurality of vertical pockets defined on said panel each having an opening disposed toward said upper edge, a horizontally disposed gun receiving pocket defined on said panel adjacent said lower edge, an access opening defined in said gun pocket adjacent said first end, and panel mounting means defined on said panel adjacent said upper edge whereby said panel is suspended from said mounting means and the panel region defining said gun receiving pocket may be flexed relative to said upper edge to facilitate access to said access opening.

2. In a vehicle storage and gun carrier as in claim 1 wherein said panel comprises outer and inner layers of flexible material sewn together by seams defining said pockets.

3. In a vehicle storage and gun carrier as in claim 2 wherein said gun receiving pocket and access opening is defined by said outer and inner layers, and closure means mounted within said access opening adapted to selectively close said access opening, said closure means comprising a plurality of hooked members affixed to one of said layers adapted to grasp a plurality of looped members affixed to the other layer.

4. In a vehicle storage and gun carrier as in claim 1, said gun receiving pocket extending between said first and second ends and having the greatest vertical dimension adjacent said first end.

5. In a vehicle storage and gun carrier as in claim 1, releasable closure means mounted on said panel within said access opening selectively closing said access opening.

* * * * *